United States Patent
Suresh et al.

(10) Patent No.: US 8,671,047 B2
(45) Date of Patent: Mar. 11, 2014

(54) POSITION-KEEPING IN A MULTI-MARKET ENVIRONMENT

(75) Inventors: Satya R. Suresh, Karnataka (IN); Ganapathy N. Subramaniam, Karnataka (IN); Sydney Mammen, Karnataka (IN); Venu Galgali, Karnataka (IN)

(73) Assignee: Tata Consultancy Services Limited (IN)

( * ) Notice: Subject to any disclaimer, the term of this patent is extended or adjusted under 35 U.S.C. 154(b) by 75 days.

(21) Appl. No.: 13/277,386

(22) Filed: Oct. 20, 2011

(65) Prior Publication Data

US 2012/0130883 A1    May 24, 2012

(30) Foreign Application Priority Data

Nov. 18, 2010   (IN) .......................... 3154/MUM/2010

(51) Int. Cl.
*G06Q 40/00* (2012.01)
*G06Q 40/04* (2012.01)
*G06Q 40/06* (2012.01)

(52) U.S. Cl.
CPC ............... *G06Q 40/00* (2013.01); *G06Q 40/04* (2013.01); *G06Q 40/06* (2013.01)
USPC ............................................. 705/37; 705/35

(58) Field of Classification Search
CPC ........ G06Q 40/00; G06Q 40/04; G06Q 40/06
USPC ..................................................... 705/37, 35
See application file for complete search history.

(56) References Cited

U.S. PATENT DOCUMENTS

| | | | |
|---|---|---|---|
| 7,620,584 B2* | 11/2009 | Lynn et al. ....................... | 705/37 |
| 7,912,781 B2* | 3/2011 | Rosenthal ........................ | 705/37 |
| 2005/0273421 A1* | 12/2005 | Rosenthal et al. .............. | 705/37 |
| 2008/0222050 A1* | 9/2008 | Grossman ................... | 705/36 R |
| 2009/0150277 A1* | 6/2009 | Larsson .......................... | 705/37 |
| 2009/0171832 A1* | 7/2009 | Busby ............................. | 705/37 |
| 2009/0276373 A1* | 11/2009 | Rosenthal .................. | 705/36 R |
| 2011/0276454 A1* | 11/2011 | Tzroya ............................ | 705/37 |
| 2012/0078772 A1* | 3/2012 | Booth ............................. | 705/37 |

OTHER PUBLICATIONS

Robinson, Richard (Nov. 2007). Proposal for addressing Multi-listed Securities Issues. ISITC. Version 1.1 retrieved Mar. 1, 2013.*
Lake, D. (1991). Country watch: Japan—linkage through multi-listings. Asian Finance, 17(2), 32. Retrieved Nov. 5, 2013.*
Ross, A. (Jan. 24, 1992). Telerate signs agreement to develop unique multi-market transaction service for philippines. Business Wire. Retrieved Nov. 5, 2013.*

* cited by examiner

*Primary Examiner* — Kito R Robinson
(74) *Attorney, Agent, or Firm* — Schwegman Lundberg & Woessner, P.A.

(57) ABSTRACT

A computerized method of implementing position-keeping in a multi-market environment is described herein. The method comprises identifying a plurality of instrument transaction parameters based on a universal instrument ID of at least one instrument. The instrument transaction parameters comprise a market level identifier and a register level identifier. Further, at least one consolidation line is generated for the instrument based on at least the plurality of instrument transaction parameters, wherein the position-keeping is achieved based on the consolidation line.

18 Claims, 4 Drawing Sheets

POSITION-KEEPING IN A MULTI-MARKET ENVIRONMENT

CLAIM OF PRIORITY

This application claims the benefit of priority under 35 U.S.C. §119 of Satya R. Suresh et al., Indian Patent Application Serial Number 3154/MUM/2010, entitled "POSITION-KEEPING IN A MULTI-MARKET ENVIRONMENT," filed on Nov. 18, 2010, the benefit of priority of which is claimed hereby, and which is incorporated by reference herein in its entirety.

BACKGROUND

Financial instruments, such as securities, are issued, priced, traded, and settled in a variety of ways. Generally, financial instruments are listed on a stock exchange and are traded henceforth. With the advent of global trading, the financial instruments are listed on more than one stock exchange or, in other words, are traded in a multi-market environment. These stock exchanges may be local, national, or international stock exchanges, over which the financial instruments are listed and traded. Such financial instruments are referred to as multi-listed instruments and have a significant impact on trading, settlement, etc.

Within the finance industry, the multi-listed instruments have to be identified at different levels, for example, to accomplish the business transaction of which they are a part. Conventionally, the multi-listed instruments are identified using different identifiers at different transaction levels. For example, traders use various versions of vendor codes to identify the multi-listed instruments, whereas in back offices or for settlement purposes, an issue level identifier, such as the International Security Identification Number (ISIN), and a National Numbering Agency scheme number, for example, Security Exchange Daily Official List (SEDOL), may be used as identifiers. These identifiers are used to distinguish between various multi-listed instruments, for determining their fungibility, and to determine a trading position of the users on different markets with respect to the various multi-listed instruments.

SUMMARY

This summary is provided to introduce concepts related to position-keeping in a multi-market environment. These concepts are further described below in the detailed description. This summary is not intended to identify essential features of the claimed subject matter nor is it intended for use in determining or limiting the scope of the claimed subject matter.

The subject matter described herein relates to a method of implementing position-keeping in a multi-market environment. The method comprises identifying a plurality of instrument transaction parameters based on a universal instrument ID of at least one instrument. The instrument transaction parameters comprise a market level identifier and a register level identifier. Further, at least one consolidation line is generated for the instrument based on at least the plurality of instrument transaction parameters, wherein the position-keeping is achieved based on the consolidation line.

BRIEF DESCRIPTION OF THE DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
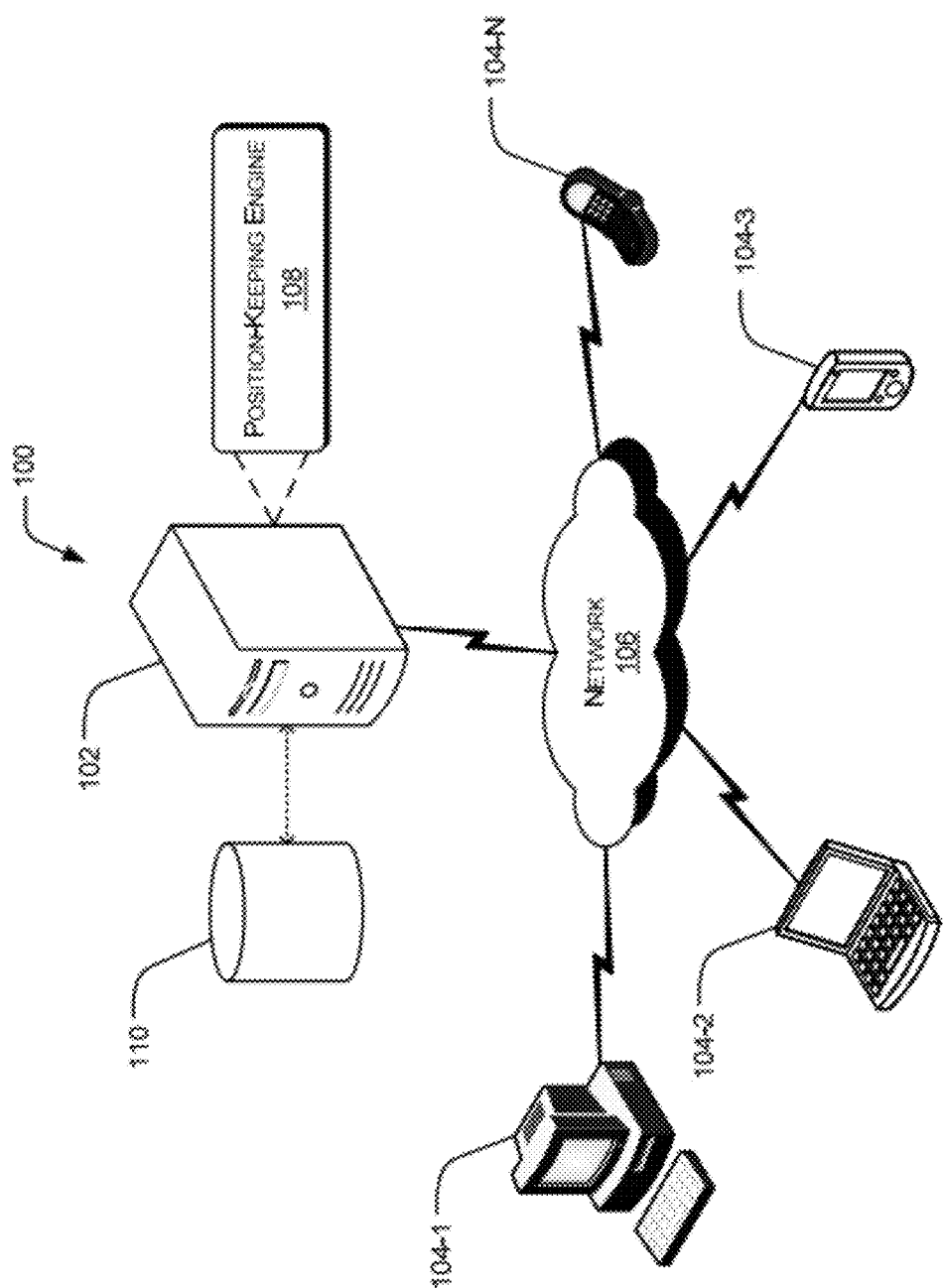
FIG. 1 illustrates an exemplary network environment implementation of a position-keeping system, in accordance with an embodiment of the present subject matter.

The subject matter described herein relates to position-keeping in a multi-market environment. Systems and methods related to position-keeping in a multi-market environment as described herein can be implemented in a variety of devices, such as a server, a desktop personal computer, a notebook or a portable computer, a mainframe computer, or a mobile computing device.

Conventionally, various identifiers, such as issue level identifiers including the International Security Identification Number (ISIN), National Numbering Agency scheme numbers, Security Exchange Daily Official List (SEDOL), etc., are used for identifying financial instruments in a business environment. The business environment, for example, may be a multi-market environment having a plurality of geographically or fiscally separated markets on which financial instruments, referred to as instruments hereinafter, can be traded. Further, based on the identifiers, trading positions of an instrument, for example, the quantity of that instrument available for trading, are maintained and safekept at various Central Securities Depositories (CSDs) or International Depositories (ICSDs). The positions of an instrument may or may not be fungible depending on the locations where they are safekept or the markets where they are traded and these fungible positions are determined based on the identifiers. Fungible positions of the instrument mean that the instruments having different positions can be grouped together and traded collectively, and the sum total of the fungible positions is the trading position of the instrument. From the perspective of an investor or a trader, the sum total of the positions associated with a trading account of the investor/trader, in terms of the various instruments in the account, is referred to as an investor/trader's trading position.

However, in certain cases these identifiers do not uniquely identify the instruments and the fungibility of their positions, which may lead to errors during transactions. For example, the SEDOL can be used to identify the instruments in an international market, but it may not serve as an appropriate identifier in a local market since it provides no distinction between the instruments listed in various exchanges of a local market. Further, the conventional identifiers used at different levels of transaction are not extensive, and they cannot be used to uniquely identify the instruments in certain situations. For example, instruments traded on the London exchange in different currencies may share a common ISIN and may also share a common SEDOL. However, these instruments having different currencies are distinct and their positions, typically, are not readily fungible. In another example, an instrument having two official places of listing (OPOLs) may also be allotted one SEDOL for identification; however, during transactions, the instruments having different OPOLs but the same SEDOL may lead to erroneous transactions.

Further, in conventional systems, in case of a corporate action, such as a merger, the instruments floated by the involved companies may require new identifiers to be configured. The configuration of new identifiers is a complex and tedious process. Thus, conventional identifiers fail to provide an effective means for identifying instruments in the present global corporate scenario where corporate actions, like mergers, are a common phenomenon.

In addition, different identifiers are relevant for different business transactions. For example, the ISIN may be relevant for settling transactions, whereas for valuation purposes, other identifiers that take into account the currency and the OPOL in which the transaction is performed, such as the SEDOL, may be relevant. The ISIN, SEDOL, or any other identifier alone may not include all the details regarding an instrument, thereby making it difficult for institutions, such as depositories and places of safekeeping, to provide asset services like safe custody (position keeping), processing corporate actions and valuations, funds accounting, tax processing, etc.

To this end, the methods and systems as described herein provide for position-keeping in a multi-market environment. From an investor/trader's perspective, the term position-keeping can be understood as maintaining a record of the investor/trader's trading position in terms of one or more instruments held by the investor/trader. From the institutions' perspective, the term position-keeping can be understood as maintaining a record of the instruments safe kept and deposited at various locations across global markets. In addition, the term investor(s)/trader(s) are hereinafter referred to as user(s) for the purpose of explanation.

According to an aspect of the subject matter, the position-keeping is achieved by configuring a position-keeping key for an instrument. The position-keeping key includes one or more instrument transaction parameters. According to an implementation, the position-keeping key for the instrument includes a universal instrument ID of the instrument and a consolidation line. The position-keeping key facilitates keeping a trading position of the user with respect to that instrument. The trading position of the user with respect to an instrument may be understood as the position of the instrument. The term position is hereinafter referred to the trading position of the user as well as that of the instrument.

The position-keeping key may include other parameters, which are dynamically selected for configuration when, for example, a maiden business transaction is performed. In one example, in case a trading transaction including buying or selling of instruments is performed, the position-keeping key is configured based on a user identity (ID), portfolio/custodian account, a universal instrument ID, and the consolidation line. In another example, in case of a settlement transaction, a street position-keeping key may be configured to clear and settle the instruments. In said example, the street position-keeping key is configured based on a custodian ID, a custodian account, the universal instrument ID, a place of settlement, and the consolidation line. Hence, the system is configured to dynamically compute the position based on the position-keeping key and other parameters relevant to the business transaction. Business transactions may include, for example, a query to determine the position of the user and the positions of an instrument that can be traded on a particular stock exchange, eligible positions for corporate actions, holdings for valuations, and tax processing.

The consolidation line may be understood as a line of trading, configured using one or more instrument transaction parameters. The instruments sharing the same transaction parameters as those in the consolidation line can be traded on that consolidation line, and hence, have fungible positions on that consolidation line. In an implementation, the consolidation line for an instrument is configured when the instrument is created at a stock exchange for trading purposes. In one example, the consolidation line includes a market level identifier for identifying the trading markets on which the instrument is listed for trading and a register level identifier for the instrument. The market level identifier may include an identifier for an official place of listing, the identifier hereinafter referred to as official place of listing (OPOL).

The register level identifier may include, for example, a registry of the instrument to indicate the currency of transaction of the instrument in that consolidation line. In an implementation, the consolidation line may include a batch size identifier, which indicates, for example, a batch size in which the instrument is traded. Further, along with the consolidation line, the position-keeping key may include the universal instrument ID, such as the ISIN.

The systems and methods for implementing and achieving position-keeping in the multi-market environment are further described with the help of an example. The following description is provided only for the purpose of explanation and is not to be construed as a limitation.

A user performing a sell transaction of the instruments held in a user transaction account may either interact with a position-keeping system directly or through an agent, both being referred to as the user hereinafter.

For the purpose of performing the sell transaction, the user provides a transaction identifier to convey the type of transaction to be executed, and conveys a set of primary transaction parameters to the position-keeping system. These primary transaction parameters include, for example, user data, such as user ID, user transaction account, the universal instrument ID, the number of units of the instrument offered for transaction, and a trading market (stock exchange). The primary transaction parameters may also include a consolidation line on which the instrument can be traded. The user transaction account can be a portfolio account held with a broker/dealer or a bank, or can be a safe custody account held with a custodian. In an example, the currency of trading may be provided separately by the user or may be determined by the system based on above mentioned primary transaction parameters.

The position-keeping system, in one implementation, may configure the position-keeping key, in the manner as described above, for the instruments in the user transaction account having the same universal instrument ID as that provided by the user along with the other primary transaction parameters. As mentioned earlier, the position-keeping key includes the universal instrument IDs and the one or more consolidation lines for each universal instrument ID. In another implementation, the position-keeping system may identify the various universal instrument IDs of the instruments in the user transaction account and may configure the position-keeping keys for all the instruments in the user transaction account.

In an implementation, the primary transaction parameters may include a set of first-pass primary transaction parameters and a set of second-pass primary transaction parameters. In one example, the first-pass primary transaction parameters include a trading market, such as a stock exchange, on which the user wants to sell the instruments. Further, in one embodiment, based on the first-pass primary transaction parameters provided by the user, during a business transaction, the position-keeping system identifies the second-pass primary transaction parameters.

In said example, the second-pass primary transaction parameters may include a consolidation line. The user selects one second-pass primary transaction parameter to achieve the transaction. In another implementation, the system may be configured to automatically select a second-pass primary transaction parameter. Based on the second-pass primary transaction parameter, the position-keeping system initiates the sell transaction of the instrument between a transaction account of a buyer of the instruments and the user transaction account. In said example, the position-keeping system identifies trading positions associated with one or more consolidation lines linked to the trading market, on which the user may sell the instruments.

In another example, the first-pass primary transaction parameters may include the consolidation line. Based on the consolidation line and other first-pass primary transaction parameters, such as the universal instrument ID, the position-keeping system identifies the second-pass primary transaction parameters. In said example, the second-pass primary transaction parameters may include the trading market, such as the stock exchange, on which the user may sell the instruments.

Further, to achieve the transaction, one or more secondary parameters are obtained by the position-keeping system automatically, based on pre-configured rules. The secondary transaction parameters may include a settlement chain and intermediaries defined for the user's instrument, for example, the custodian, agent, or a place of safekeeping. In one embodiment, the secondary parameters are obtained from the standard definition of settlement chains defined at the level of the primary transaction parameters. For example, the stock exchange and/or the consolidation line are associated with one or more institutions relevant for safekeeping of the user's instruments.

Further, the position-keeping system may obtain tertiary transaction parameters, such as instrument delivery instructions including the settlement chain defined for the counterparty, for example, the place of settlement of the instrument, custodian of the counterparty, and/or agent of the counterparty. The counterparty can be understood as the complementary party trading the instruments with the user. In one implementation, the position-keeping system receives the tertiary transaction parameters from the user by prompting the user to provide these parameters. In another implementation, the information regarding the tertiary parameters is associated with a few of the primary transaction parameters and is obtained by the system.

The tertiary transaction parameters are provided to the relevant institutions, for example, the custodians and depositories, associated with the instruments held in the user transaction account. Once the instructions are executed, the trading position of the user is updated based on the position-keeping key of the instruments that are traded, in case the user already includes a position configured in the position-keeping system, i.e., the user has already performed a business transaction using the position-keeping system. In case, the user performs a maiden business transaction using the system, the system configures a position-keeping key for the user transaction account based on a user ID, the universal instrument ID, and the consolidation line, and stores the trading position of the user.

Further, in one example, the position-keeping key facilitates in determining the trading position of the user to ascertain whether a transaction being requested by the user can be allowed or not. In said example, the inclusion of consolidation line in the position-keeping key provides an accurate determination of the trading position of the user, avoiding errors and subsequent losses during trading. Such a position-keeping key configured to maintain a record of the trading position of the user, based on the consolidation line, can also be used for valuation purposes.

In addition, the position-keeping key can also be used to determine a fungibility of the positions of one or more instruments. For example, the positions of the instruments acquired on different stock exchanges by the user can be compared to determine whether the positions are fungible and can be transacted together. Furthermore, the overall global position of a user with reference to an instrument can be obtained by excluding the consolidation line from the position-keeping key. For example, if an instrument X is traded on a European stock exchange and a US stock exchange and a user has acquired positions of the instrument X on both the stock exchanges, then the acquired positions will correspond to various consolidation lines linked with the two stock exchanges. The overall position of the user with reference to the X instrument can be obtained by removing the consolidation line from the position-keeping key and summing all units of the instrument held by the user.

The position-keeping key is not required to be configured afresh in the event of another type of business transaction, for example, a corporate action. In addition, the position-keeping key is configured in such a way that the same may be adapted for various types of business transactions. Hence, the position-keeping key including the consolidation line may serve as a unique identifier for various types of business transactions, such as trading and settlement, and at different levels of the market, for example, in the international market as well as a local market.

While aspects of described systems and methods for recovery of mail items can be implemented in any number of different computing systems, environments, and/or configurations, the embodiments are described in the context of the following exemplary system architecture(s).

Exemplary Systems

FIG. 1 illustrates an exemplary network environment 100 implementing a position-keeping system 102, in accordance with an embodiment of the present subject matter. In said embodiment, the position-keeping system 102 is connected to a plurality of user devices 104-1, 104-2 . . . 104-N, collectively referred to as the user devices 104 and individually referred to as a user device 104. The position-keeping system 102 and the user devices 104 may be implemented as any of a variety of conventional computing devices, including, for example, servers, a desktop PC, a notebook or portable computer, a workstation, a mainframe computer, a mobile computing device, an entertainment device, and an internet appliance.

The position-keeping system 102 is connected to the user devices 104 over a network 106 through one or more communication links. The communication links between the position-keeping system 102 and the user devices 104 are enabled through a desired form of communication, for example, via dial-up modem connections, cable links, digital subscriber lines (DSL), wireless or satellite links, or any other suitable form of communication.

In one implementation, the network environment 100 can be a company network, including thousands of office personal computers, laptops, various servers, such as blade servers, and other computing devices connected over the network 106.

In another implementation, the network environment 100 can be a home network with a limited number of personal computers and laptops connected over the network 106.

The network 106 may be a wireless network, a wired network, or a combination thereof. The network 106 can also be an individual network or a collection of many such individual networks, interconnected with each other and functioning as a single large network, e.g., the Internet or an intranet. The network 106 can be implemented as one of the different types of networks, such as intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the network 106 may include network devices, such as network switches, hubs, routers, HBAs, for providing a link between the position-keeping system 102 and the user devices 104. The network devices within the network 106 may interact with the position-keeping system 102 and the user devices 104 through the communication links.

Trader(s) or investor(s) or agent(s) of the trader(s) and investor(s) including the firm providing the trading services may be collectively referred to as users. The users may interact through the user devices 104 with the position-keeping system 102 to carry out various business transactions related to the instruments. These transactions may include, for example, a query to determine the position of the user and the positions of the instruments that can be traded on a particular stock exchange, eligible positions for corporate actions, holdings for valuations, and tax processing. To facilitate the execution of the transactions, the position-keeping system 102 configures a position-keeping key relevant to the instruments being traded by the users.

In an embodiment, the position-keeping system 102 is associated with user transaction accounts of all the users. The position-keeping system 102 obtains data pertaining to the instruments held in the user transaction account of each user. A user transaction account serves as a depository of the instruments acquired by a user. Examples of user transaction accounts include custodians and depositories, such as the Central Securities Depositories (CSDs) and the International depositories (ICSDs). In one example, the user transaction account may be associated with the various trading markets, for example, the stock exchanges, on which the user trades.

In one embodiment, the position-keeping system 102 includes a position-keeping engine 108 to configure the position-keeping keys for the various user transaction accounts associated with the position-keeping system 102. In said embodiment, to configure the position-keeping key for a user transaction account, the position-keeping engine 108 identifies the instruments in that user transaction account based on, for example, the universal instrument IDs of the instruments. The universal instrument IDs may include, for example, the ISINs, of the instruments.

Based on the universal instrument ID of each instrument, the position-keeping engine 108 identifies and obtains instrument transaction parameters for the instrument from a repository 110 based on a universal instrument ID. The repository 110, in an embodiment, is communicably coupled to the position-keeping system 102 through the network 106 in the network environment 100. In one embodiment, the repository 110 is populated by various trading markets, for example, stock markets, to store instrument transaction parameters of the various instruments afloat in the commercial space in the repository 110. These instrument transaction parameters may include, for example, identifiers for the official places of listing of the instruments, registers of the instruments, and batch sizes of trading the instruments.

It will be understood that although in the embodiment described above, the instrument transaction parameters are identified and obtained from the repository 110; in other embodiments, the position-keeping system 102 may maintain its own internal repository (not shown), which can be updated according to the data present on the repository 110. In said embodiment, the position-keeping system 102 identifies the instrument transaction parameters in the internal repository and obtains them from the internal repository.

Once the instrument transaction parameters are obtained for the each instrument, the position-keeping engine 108 creates one or more consolidation lines for the instrument based on the instrument transaction parameters, such as one or more market level identifiers of the instrument and one or more register level identifier of the instrument. In one example, the market level identifiers are official places of listing (OPOLs) of the instrument and the register level identifiers are registries of the instrument indicative of the currencies in which the instrument is traded. In one embodiment, the instrument transaction parameters include batch size identifiers, which determine sizes of batches in which the instrument is traded. In one implementation, the instrument transaction parameters based on which the one or more consolidation lines are created, are selected by a user from amongst a plurality of the instrument transaction parameters obtained by the position-keeping system 102, during the creation of the consolidation line.

The consolidation line, hence configured by the position-keeping engine 108, is indicative of a line of trading on which the instrument can be traded. The trading positions of an instrument held in different trading accounts and at different institutions and which can be traded with each other are referred to as fungible positions. In one implementation, to determine the fungibility of the positions of the instrument on a particular consolidation line, the position-keeping engine 108 further configures the position-keeping key for the instrument based on the universal instrument ID of the instrument and the consolidation line. In an implementation, each consolidation line is associated with those trading markets that permit transaction of instrument having that consolidation line in its position-keeping key.

In one example, the position-keeping key is configured by appending the universal instrument ID of the instrument with one of the consolidation lines on which the instrument can be traded. Similarly, a plurality of position keeping keys can be configured for the instrument based on the plurality of consolidation lines on which the instrument can be traded. In said example, the universal instrument ID appended with one consolidation line forms one position-keeping key, and hence, the number of position-keeping keys for the instrument is same as the number of the consolidation lines for that universal instrument ID. In one implementation, the position-keeping engine 108 configures the position-keeping key for an instrument when the instrument is created at a stock exchange for trading.

In this way, the position-keeping engine 108 configures the position-keeping keys for the various instruments in the user transaction account of the user and stores these position-keeping keys in a database (not shown in the figure). As mentioned earlier, the universal instrument ID of each of the instrument in the user transaction account is associated with the one or more consolidation lines on which it can be traded. The position-keeping key configured for one instrument facilitates the position-keeping system 102 to keep a record of a trading position of the user with respect to that instrument. For example, a cumulative sum of all the trading positions of the instruments on various stock exchanges having a common position-keeping key in the user transaction account is indicative of the trading position of the user with respect to that instrument on the consolidation line. On the other hand, if a stock exchange is linked to more than one unique consolidation line, then the positions of that instrument on different consolidation lines are considered as separate positions and thus are not fungible.

Further, to carry out a transaction of the instruments, in one embodiment, the position-keeping system 102 receives one or more primary transaction parameters to carry out a transaction of one or more instruments. The transaction may include buying, selling, valuation, settlements, tax processing, etc. In one implementation, the primary transaction parameters include a set of first-pass primary transaction parameters and one or more second-pass primary transaction parameters. The first-pass primary transaction parameters may include, for example, the universal instruments ID; a user transaction account ID, such as the custodian ID; and units of the instruments offered for transaction. Further, in one example, the primary transaction parameters may include a trading market identifier. In said example, the trading market identifier is indicative of a stock exchange for instrument trading and is a part of the first-pass primary transaction parameters. In another example, the first-pass primary transaction parameters include the consolidation line of instrument trading.

On receiving the first-pass primary transaction parameters, the position-keeping system 102 determines one or more second-pass primary transaction parameters. In one example, when the first-pass primary transaction parameters include the trading market identifier along with the universal instrument ID and the user transaction account, then the second-pass primary transaction parameters may include the consolidation lines on which the instruments can be traded. In said example, the position-keeping system 102 determines one or more consolidation lines of trading on which the instruments in the user transaction account having the same universal instrument ID as in the primary transaction parameters can be traded.

In the other example, in which the first pass-primary transaction parameters include the consolidation line, the second-pass primary transaction parameters may include the trading market identifier, such as the stock exchanges, on which the instruments can be traded.

Further, once the second-pass primary transaction parameters are determined, in one embodiment, the position-keeping system 102 receives one of the second-pass primary transaction parameters. In an embodiment, the second-pass primary transaction parameter is selected by the user and provided to the position-keeping system 102.

In yet another implementation, the position-keeping system 102 is configured to proceed with the transaction without determining the second-pass primary transaction parameters when the first-pass primary parameters include a trading market identifier, such as the stock exchange. In such an implementation, the stock exchange is associated with one official place of listing and one registry, and allows transactions of a particular batch size of the instrument(s).

Further, the position-keeping system 102 obtains one or more secondary transaction parameters from, for example, the repository 110. In said example, the secondary transaction parameters are associated with the primary transaction parameters. In an implementation, the secondary transaction parameters may include a settlement chain of the user's instruments, such as the custodian, the agent, and the place of safekeeping of the instrument. Furthermore, the position-keeping system 102 may obtain tertiary transaction parameters, for example, instrument delivery instructions of the stock exchange, for example, custodian ID of the counterparty, and a place of settlement. In an embodiment, the data relevant to the tertiary transaction parameters is associated with the primary transaction parameters and is obtained by the position-keeping system 102. In another embodiment, the position-keeping system 102 may prompt the user to provide a few or all of the secondary and tertiary transaction parameters.

In one embodiment, the position-keeping system 102 validates the transaction before executing the transaction. In said embodiment, the position-keeping system 102 identifies the position-keeping key of the instruments offered for trading based on the primary transaction parameters, and identifies the user transaction account based on the user account ID. Further, the position-keeping system 102 determines the instruments in the user transaction account based on the identified position-keeping key and ascertains whether the transaction to be executed is valid or not. For example, to validate a transaction, the position-keeping system 102 may check the trading position of the user with respect to the instrument against the number of instruments available with the user and offered for transaction on the selected consolidation line. Based on the validation, the position-keeping system 102 may achieve or suspend the transaction.

On the execution of the transaction, the position-keeping system 102 may update the position of the instruments in the user transaction account based on the position-keeping key of the instruments that are traded. With the updation of the positions of the instruments, the trading position of the user holding the user transaction account is also updated.

Figure 2:
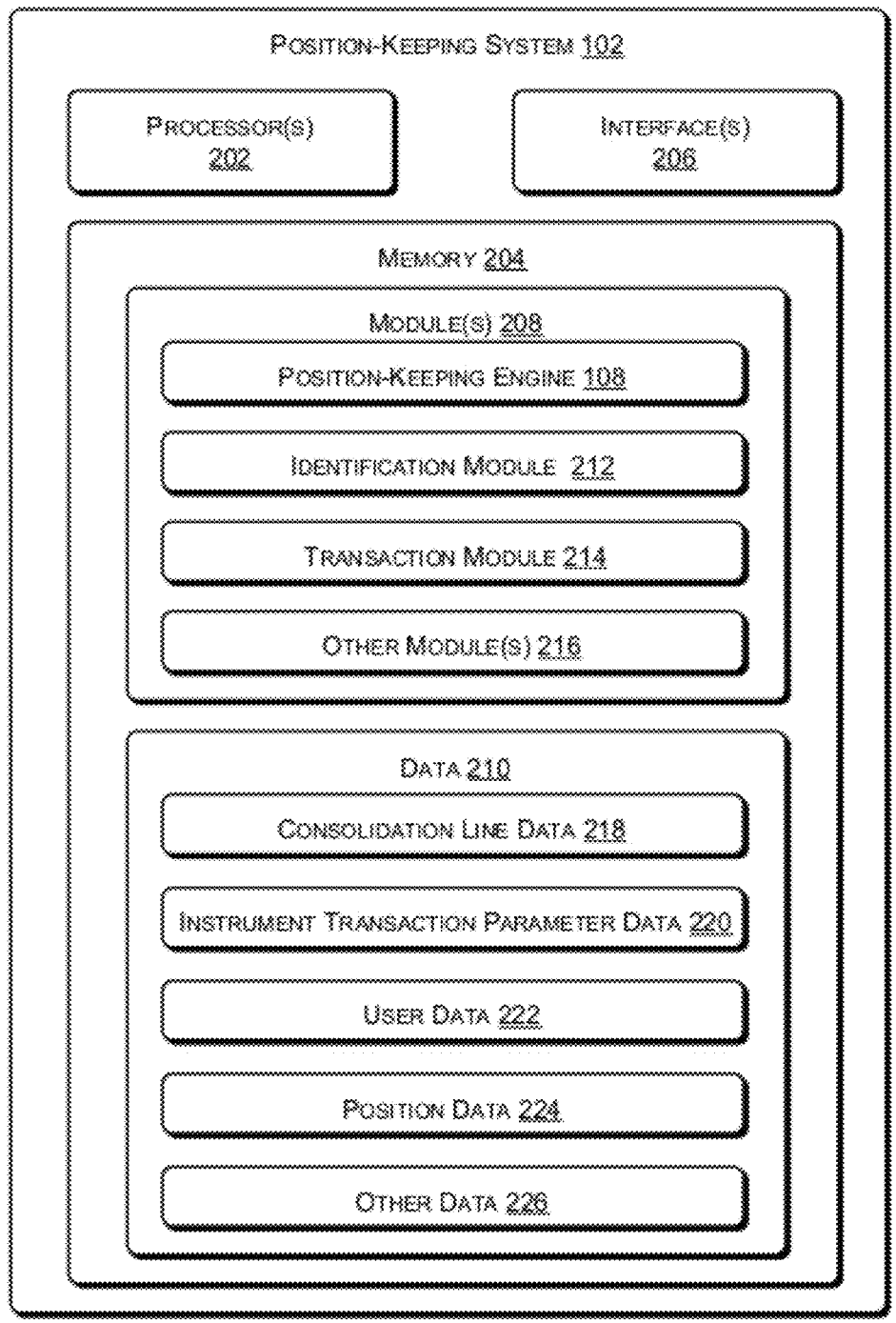
FIG. 2 illustrates an exemplary position-keeping system, in accordance with an implementation of the present subject matter.

FIG. 2 illustrates exemplary components of the position-keeping system 102, according to an embodiment of the present subject matter. In said embodiment, the position-keeping system 102 includes one or more processor(s) 202, interface(s) 204, and a memory 206 coupled to the processor 202.

The processor 202 can be a single processing unit or a number of units, all of which could include multiple computing units. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions and data stored in the memory 204.

The I/O interfaces 206 may include a variety of software and hardware interfaces, for example, interface for peripheral device(s) such as a keyboard, a mouse, an external memory, a printer, etc. Further, the I/O interfaces 206 may enable the position-keeping system 102 to communicate with other computing devices, such as web servers and external databases. The I/O interfaces 206 may facilitate multiple communications within a wide variety of protocols and networks, such as the network 106, including wired networks, e.g., LAN, cable, etc., and wireless networks, e.g., WLAN, cellular, satellite, etc. The I/O interfaces 206 may include one or more ports for connecting the position-keeping system 102 to a number of computing devices, such as the user devices 104.

The memory 204 may include any computer-readable medium known in the art including, for example, volatile memory such as static random access memory (SRAM) and dynamic random access memory (DRAM), and/or non-volatile memory, such as read only memory (ROM), erasable programmable ROM, flash memories, hard disks, optical disks, and magnetic tapes. The memory 204 also includes module(s) 208 and data 210.

The modules 208 include routines, programs, objects, components, data structures, etc., which perform particular tasks or implement particular abstract data types. The modules 208 further include, for example, the position-keeping engine 108, an identification module 212, a transaction module 214, and other modules 216. The other modules 216 may include programs or coded instructions that supplement applications and functions on the position-keeping system 102, for example, programs in the operating system.

On the other hand, the data 210, amongst other things, serves as a repository for storing data processed, received, and generated by one or more of the module(s) 208. The data 210 includes, for example, consolidation line data 218, instrument data 220, user data 222, position data 224, and other data 226. The other data 226 includes data generated as a result of the execution of one or more modules in the other modules 216.

In operation, the position-keeping engine 108 configures the position-keeping key for various instruments. As mentioned previously, in one implementation, the position-keeping engine 108 obtains the universal instrument ID as a user input, and based on the universal instrument ID, the position-keeping engine 108 obtains a plurality of instrument transaction parameters, for example, from the repository 110. In an embodiment, the instrument transaction parameters are stored in the instrument transaction parameter data 220.

Further, in one embodiment, the position-keeping engine 108 obtains a few instrument transaction parameters upon selection of these instrument transaction parameters by the user. In one example, these instrument transaction parameters are selected by the user from the plurality of instrument transaction parameters. The obtained instrument transaction parameters may include, for example, market level identifiers, register level identifiers, and batch size identifiers of the instrument. For example, the instrument transaction parameters may provide details of the instrument in terms of the OPOLs of the instrument, the currencies, and the batch sizes in which the instrument is traded, etc.

Once the instrument transaction parameters are obtained, the position-keeping engine 108 determines the various combinations of the instrument transaction parameters, such as the market level identifiers, the register level identifiers, and the batch size identifiers, to determine one or more consolidation lines for the instrument. In one example, the various combinations of the instrument transaction parameters are based on combinations in which the instruments are traded at various trading markets, such as stock exchanges. As mentioned previously, the various consolidation lines associated with the instrument are indicative of the different lines of trading on which the instrument can be traded. In one embodiment, the various consolidation lines configured for the instrument are stored in the consolidation line data 218.

Further, the position-keeping system 102 is configured to create position-keeping keys for the instrument. In an embodiment, the position-keeping engine 108 configures the position-keeping key of the instrument based on the universal instrument ID of the instrument and the consolidation lines associated with the instrument. In one example, a combination of the universal instrument ID with one of the consolidation lines associated with the instruments form the basis of one position-keeping key. Hence, the number of position-keeping keys for an instrument is the same as the number of consolidation lines obtained for that instrument. In an embodiment, the position-keeping key for the instrument is stored in the position data 224.

For example, for the instruments having the universal instrument ID as ISIN1, the following instrument transaction parameters may be selected for creating the consolidation line: OPOL1 as the market level identifier, R1 and R2 as the register level identifiers, and LS1 as the batch size identifier. In said example, two consolidation lines are created for the instrument with the universal instrument ID as ISIN1. The two consolidation lines are based on two combinations—OPOL1, R1, and LS1, and OPOL1, R2, and LS1. Further, based on the two consolidation lines, the instrument has two position-keeping keys, i.e., ISIN1, OPOL1, R1, and LS1, and ISIN1, OPOL1, R2, and LS1.

The above mentioned concept of implementing position-keeping further facilitates the position-keeping system 102 in accomplishing the transaction of various instruments in a multi-market environment. In such a trading environment, the instruments are listed across various markets for trading.

The position-keeping system 102 is associated with a plurality of user transaction accounts and each user of the user transaction account holds an assortment of instruments in the user transaction account. As mentioned earlier, the user transaction account may be associated with the custodians and depositories of the various trading markets, such as stock exchanges, on which the user trades the instruments.

In one implementation, the position-keeping engine 108 configures the position-keeping key and computes positions for all the instruments in each user transaction account associated with the position keeping system 102. The data relevant to the user transaction accounts and the various instruments in the user transaction accounts is stored in the user data 222. In an implementation, the position-keeping system 102 prompts the position-keeping engine 108 to configure the position-keeping keys for the instruments in a user transaction account based on a user input, for example, a user input to initiate a transaction. In said embodiment, the position-keeping key for each instrument in the user transaction account is stored in the position data 224.

To configure the position-keeping key(s), in one embodiment, the identification module 212 identifies the various universal instrument IDs associated with the various instruments in the user transaction account. Based on the universal instrument IDs, the identification module 212 obtains the instrument transaction parameters for each of the universal instrument ID, for example, from the repository 110. As mentioned previously, the identification module 212 stores the instrument transaction parameters, such as the market level identifiers, the batch size identifiers, and the register level identifiers, in the instrument transaction parameter data 220. For each universal instrument ID, i.e., for each group of instruments having the same universal instrument ID, the various consolidation lines and the various position-keeping keys are configured as explained above, and are stored in the consolidation line data 218 and the position data 224, respectively. In an implementation, each consolidation line is associated with the various trading markets that permit transaction of the instruments having that particular consolidation line in their position-keeping keys. The different trading markets associated with the various consolidation lines may be stored in the consolidation line data 218.

Further, during a transaction of instruments held in a user transaction account, the position-keeping keys facilitate easy and accurate transactions of the instruments. During transactions, the position-keeping key for an instrument facilitates determining the fungibility of the positions of that instrument and in carrying out the transactions. In an implementation, the instruments sharing a common position-keeping key, and hence, a common consolidation line, are said to have fungible positions and can be traded together. Further, the cumulative amount of the fungible positions of the instrument held by the user in the user transaction account on a given consolidation line is the trading position of the user on that consolidation line with respect to the instrument. Hence, the position-keeping key can be used to determine the trading position of the user with respect to instruments traded in a multi-market environment.

Now consider a transaction of certain units of an instrument. In such a case, the position-keeping engine 108 of the position-keeping system 102 receives the first-pass primary transaction parameters, pertinent to the instruments, from the user. The first-pass primary transaction parameters may include, for example, the universal instruments ID, a user transaction account ID, and the number of units of the instruments offered for the transaction. In addition, the first-pass primary transaction parameters may also include the consolidation line on which the transaction of the instrument is to be achieved. In said implementation, based on the first-pass primary transaction parameters, the transaction module 214 identifies the second-pass primary transaction parameters. In said implementation, the second-pass primary transaction parameters include one or more trading markets, for example, the stock exchanges, on which the instruments are being transacted. In one example, the transaction module 214, based on the first-pass primary transaction parameters, such as the universal instrument ID and the consolidation line, identify the various stock markets or exchanges on which the transaction of the instrument can be achieved.

Based on the selection of one of the various second-pass primary transaction parameters, the transaction module 214 initiates the transaction. In an implementation, the transaction module 214 identifies the user transaction account based on the primary transaction parameters, for example, the user transaction account ID. Further, based on the first-pass and second-pass primary transaction parameters, such as the universal instrument ID, and, the trading market, the transaction module 214 determines the instruments in the user transaction account that are to be traded. In one implementation, the transaction module 214 determines such instruments based on the position-keeping key(s) of the instruments in the position data 224.

Once the instruments to be traded are determined, in one implementation, the transaction module 214 may prompt the user to provide the secondary transaction parameters, for example, the custodian ID of the user's instruments and the place of safekeeping, and the tertiary transaction parameters, for example, instrument delivery instructions including the custodian ID of the counterparty and the place of settlement. In another implementation, the data pertinent to the secondary and tertiary transaction parameters is obtained by the transaction module 214 based on the primary transaction parameters stored in the other data 226.

In an implementation, the transaction module 214 validates the transaction, for example, selling of the instruments, before the transaction is to be accounted for by the position-keeping system 102. In said implementation, the transaction module 214, based on the position-keeping key(s) of the instruments to be traded, determines the trading position of the user on the selected consolidation line, as included in the primary transaction parameters, with respect to the instruments offered for trade. Further, based on the trading position of the user, the transaction module 214 may allow a transaction or return an error message. In one example, the transaction module 214 validates the transaction based on the number of units offered for sale against the trading position of the user with respect to that instrument on the selected consolidation line.

Upon validation of the transaction, the transaction module 214 provides the secondary and tertiary transaction parameters to the relevant agencies, for example, the custodians and depositories, associated with the user transaction account holding the instruments and those associated with an account of the counterparty. Once the transaction is executed, the trading position of the user is updated by the position-keeping engine 108 based on the position-keeping key of the instruments that are traded, in case the user already holds a position in the position-keeping system 102, i.e., the user has already performed a business transaction using the position-keeping system 102. On the other hand, in case the transaction is a maiden business transaction performed by the user using the position-keeping system 102, the position-keeping system 102 configures a position-keeping key for the user transaction account based on a user ID and the universal instrument ID, and subsequently stores the trading position of the user.

In another implementation, the first-pass primary transaction parameters, along with the universal instrument ID and the user account ID, include the trading markets/stock exchanges instead of the consolidation line. In said implementation, the second-pass primary parameters identified by the position-keeping engine 108 include one or more consolidation lines on which the instruments can be traded. That said, the transaction of the instruments is achieved by the position-keeping system 102 in the same manner as described above.

Although the above description is provided for the transaction of the instruments having the same universal instrument ID, it will be understood that the position-keeping system 102 may achieve the transaction of various instruments having different universal instrument IDs, in the same manner as described above.

Figure 3:
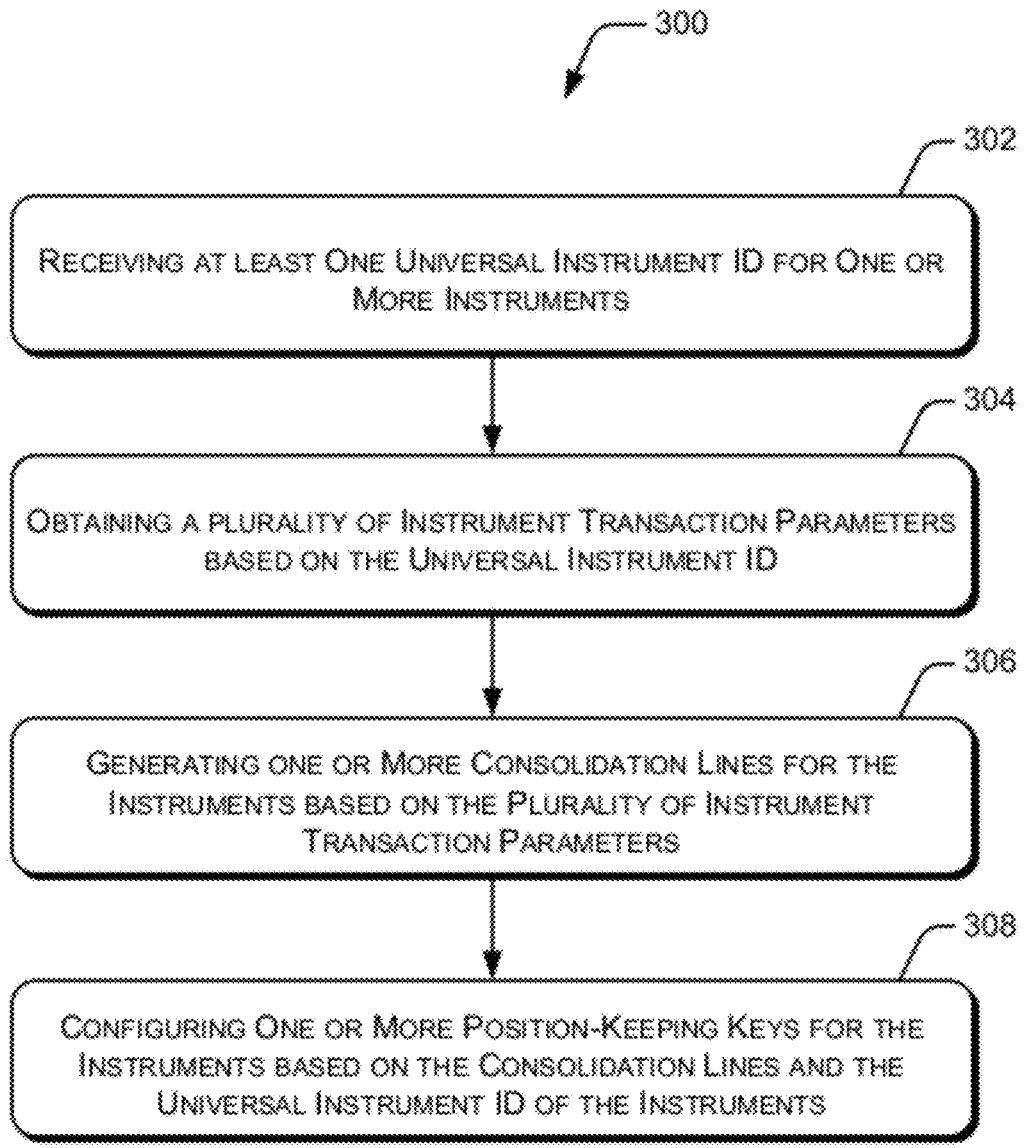
FIG. 3 illustrates an exemplary method for implementing position-keeping in a multi-market environment, in accordance with an implementation of the present subject matter.
Figure 4:
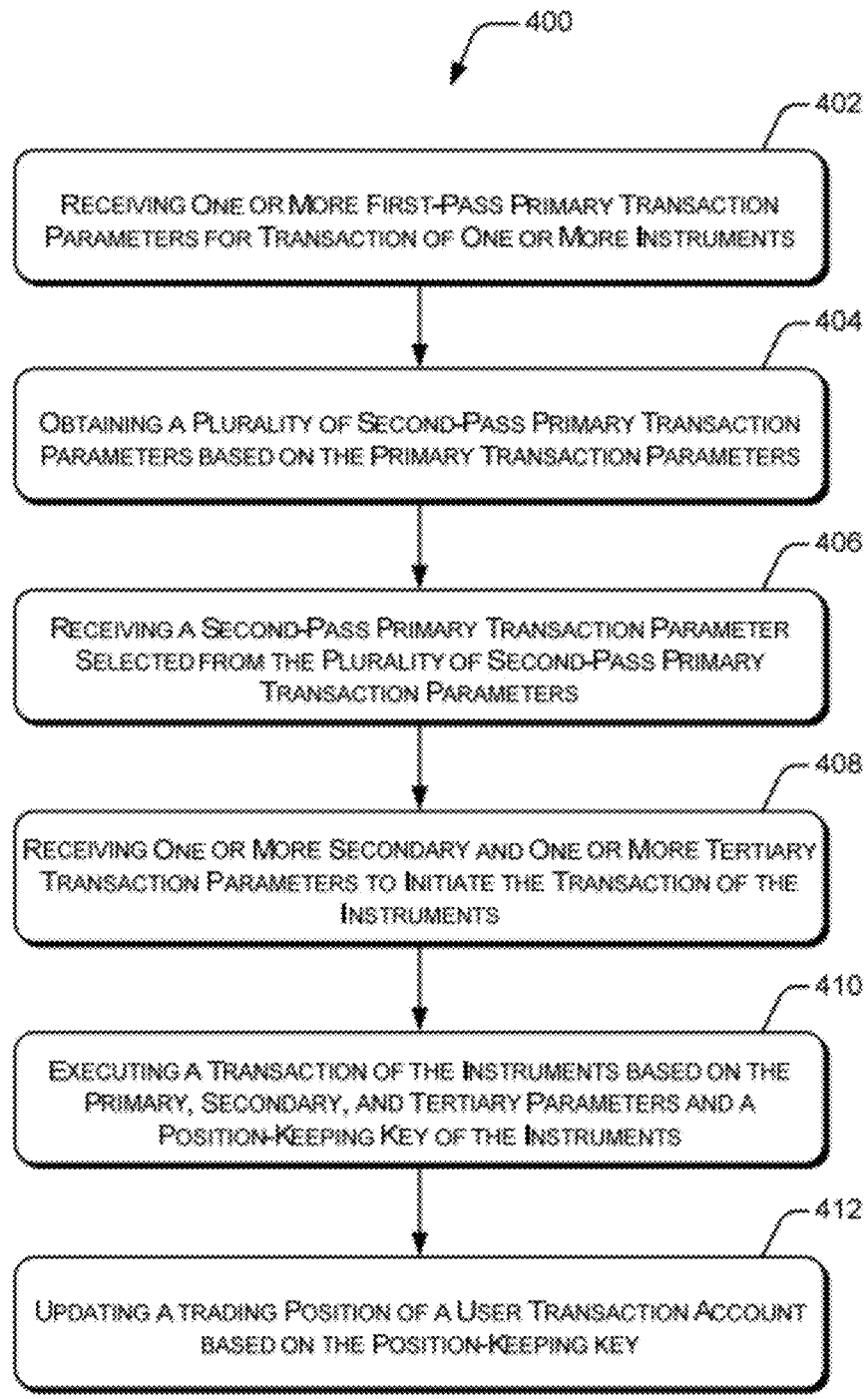
FIG. 4 illustrates an exemplary method for position-keeping while trading in a multi-market environment, in accordance with an implementation of the present subject matter.

FIG. 3 and FIG. 4 illustrate exemplary methods for position-keeping in a multi-market environment, according to an implementation of the present subject matter. The exemplary methods may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network. In a distributed computing environment, computer executable instructions may be located in both local and remote computer storage media, including memory storage devices.

The order in which the methods are described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the methods can be implemented in any suitable hardware, software, firmware, or combination thereof. The methods are presently provided for position-keeping in a multi-market environment. It would be appreciated that the same methods can also be implemented for position-keeping in other market environments without deviating from the scope of the present subject matter.

FIG. 3 illustrates an exemplary method of implementing position-keeping in a multi-market environment, according to an implementation of the present subject matter.

At block 302, at least one universal instrument ID is received for one or more financial instruments, hereinafter referred to as instruments. In an implementation, the universal instrument ID is received by a position-keeping engine, such as the position-keeping engine 108. In said implementation, the universal instrument ID is received for the instruments held in a user transaction account of a user. In one implementation, the position-keeping engine 108 receives the universal instrument ID when the user transaction account is associated with the position-keeping system 102. In another implementation, the position-keeping engine 108 receives the universal instrument ID when the user initiates a transaction of the instruments on the position-keeping system 102. Further, the position-keeping engine 108 provides the instrument transaction parameters to an identification module, such as the identification module 212.

At block 304, one or more instrument transaction parameters are obtained based on the universal instrument ID. In one implementation, the identification module 212 identifies the instrument transaction parameters from a repository, such as the repository 110, based on the universal instrument ID and provides these instrument transaction parameters to the position-keeping engine 108. Further, the identification module 212 may store these instrument transaction parameters in an instrument transaction parameter data, such as the instrument transaction parameter data 220.

In another implementation, after identifying the various instrument transaction parameters from the repository 110, the identification module 212 selects few of the instrument transaction parameters from the various instrument transaction parameters and stores these selected instrument transaction parameters in the instrument transaction parameter data 220. The instrument transaction parameters selected and stored by the identification module 212 include, for example, market level identifiers, register level identifiers, and batch size identifiers.

At block 306, the position-keeping engine 108 generates one or more consolidation lines for the instrument, i.e., for the universal instrument ID. In one implementation, the position-keeping engine 108 generates the consolidation lines based on the instrument transaction parameters selected and stored by the identification module 212. In another implementation, the position-keeping engine 108 prompts a user to select the instrument transaction parameters and generates the consolidation line based on the instrument transaction parameters selected and provided by the user.

Further, in one implementation, the instrument transaction parameters selected for the generation of the consolidation lines include the market level identifiers and the register level identifiers. In another implementation, the consolidation lines are generated based on the batch size identifiers, the market level identifiers and the register level identifiers.

In one implementation, the user selects the instrument transaction parameters from the various instrument transaction parameters obtained from the repository 110 and stored in the instrument transaction parameter data 220. In another implementation, as mentioned earlier, the position-keeping engine 108 uses the already selected instrument transaction parameters obtained from the repository 110.

Further, in an implementation, each of the consolidation lines is associated with one or more trading markets, for example, stock exchanges, on which instruments similar to those stored in the consolidation line, in terms of parameters, can be traded. In said implementation, the trading markets associated with the consolidation line are stored in a consolidation line data, such as the consolidation line data 218.

Further, at block 308, the position-keeping engine 108 configures one or more position-keeping keys for the instrument(s). In one example, the position-keeping key is configured by appending the universal instrument ID of the instrument along with the consolidation line. Further, the position-keeping key may include other parameters depending on the transaction for which the position-keeping key is used.

In an implementation, the position-keeping engine 108 configures one position-keeping key for each combination of the consolidation line pertaining to trading the instrument and the universal instrument ID. Hence, the number of position-keeping keys configured for an instrument can be the same as the number of the consolidation lines generated for that instrument.

FIG. 4 illustrates an exemplary method of keeping and updating a user's trading position in the multi-market environment, according to an implementation of the present subject matter. In one implementation, the method of position-keeping and updating the positions is achieved by the position-keeping system 102 after position-keeping in a multi-market environment is implemented in the position-keeping system 102 as described in FIG. 3.

At block 402, one or more first-pass primary transaction parameters are received for a transaction of one or more instruments in a user transaction account. The first-pass primary transaction parameters may include, for example, at least one universal instrument ID, a user transaction account ID, and a number of units of the instruments offered for sale. In one example, the first-pass primary transaction parameters include a consolidation line along with the universal instrument ID and the user transaction account ID. In another example, the first-pass primary transaction parameters include a trading market identifier, such as a stock exchange identifier, instead of the consolidation line.

In one implementation, a transaction module, such as the transaction module 214, receives the first-pass primary transaction parameters from, for example, a user holding the user transaction account.

At block 404, one or more second-pass primary transaction parameters are obtained by the transaction module 214. In one implementation, the transaction module 214 identifies and obtains the second-pass primary parameters based on the first-pass primary transaction parameters received at block 402. In said implementation, the transaction module 214 identifies the second-pass primary transaction parameters from the instrument transaction parameters stored in the instrument transaction parameter data 220.

In one example, when the first-pass primary transaction parameters include the universal instrument ID, the user transaction account, and the consolidation line, the second-pass primary transaction parameters may include trading market identifiers, for example, identifiers for one or more stock exchanges on which the instruments can be traded. In another example, when the first-pass primary transaction parameters include the trading market identifier along with the universal instrument ID and the user transaction account, the second-pass primary transaction parameters may include one or more consolidation lines on which the instruments can be traded.

At block 406, at least one second-pass primary transaction parameter is selected from the one or more of the second-pass primary transaction parameters obtained at block 404. In one implementation, the second-pass primary transaction parameter is selected by a user trading the instruments, based on, for example, the consolidation line or the stock exchange. In another implementation, the transaction module 214 selects the second-pass primary transaction parameter from the various second-pass primary transaction parameters obtained at block 404 based on rules already defined by the user. Further, the selected second-pass primary transaction parameter is received by the transaction module 214 of the position-keeping system 102.

Once the second-pass primary transaction parameter is selected and received, at block 408, one or more secondary and one or more tertiary parameters are received to execute the transaction. The secondary parameters may include, for example, the settlement chain of the user's instruments. The secondary parameters may also include the custodian ID of the user's instruments and the place of safekeeping. The tertiary parameters may include, for example, custodian ID of the counterparty and a place of settlement for the instruments. In one implementation, the transaction module 214 receives the secondary and the tertiary transaction parameters when the transaction module 214 sends a request to the user to provide these parameters. In another implementation, the transaction module 214 identifies and receives the secondary and the tertiary parameters from instrument transaction parameter data 220 to execute the transaction, based on the first-pass and the second-pass primary transaction parameters. In yet another implementation, the transaction module 214 may receive few of the secondary and tertiary parameters from the user and few others from the instrument transaction parameter data 220.

Further, at block 410, the transaction of the instruments is executed based at least on the primary, the secondary, and the tertiary transaction parameters of the instruments. In one implementation, the transaction module 214 determines those instruments held in the user transaction account that have the same parameters as those defined in the first-pass and second-pass primary transaction parameters. For example, the transaction module 214 may determine the instruments available for transaction based on the consolidation lines or the trading markets stored in the consolidation line data 218 for the instruments. In another example, the transaction module 214 may determine the instruments based on the position-keeping key configured for the instruments and stored in the memory as, for example, the position data 224.

In addition, according to an implementation, the execution of the transaction is completed based on a validation of the transaction. In an implementation, the transaction module 214 determines a trading position of the user for the instrument, i.e., for the universal instrument ID, based on the selected primary transaction parameters such as the consolidation line and the trading market. As mentioned earlier, the trading position of the user for the instrument on a given consolidation line is the cumulative sum of the positions of that instrument in the user transaction account that have the same consolidation line in the position-keeping key(s) of the instruments. In one example, the transaction module 214 determines the trading position of the user based on the position data 224. Further, in one implementation, the transaction module 214 validates the transaction by checking the number of instruments offered for sale against the trading position of the user for the instrument(s), and determines whether the transaction can be executed or not. Upon validation of the transaction, the transaction module achieves the transaction of the instruments. Further, in one example, the various secondary and tertiary parameters are provided to the relevant trading agencies for the settlement of the instruments.

At block 412, the trading position of the user with reference to the traded instrument is updated upon the execution of the transaction. In an implementation, the trading position of the user is updated by the position-keeping engine 108, based on the position-keeping key of the instruments that are traded and based on the transaction, i.e., the primary, secondary, and the tertiary transaction parameters. It will be understood that the updating of the trading position of the user is inherently based on the consolidation line on which the instrument is traded. Further, in one example, when the user executes a maiden transaction by implementing the position-keeping system 102, the position-keeping system 102 configures the position-keeping key for the instruments held by the user in the same manner as described above, and accordingly stores the trading position of the user.

Although embodiments for position keeping in a multi-market environment have been described in language specific to structural features and/or methods, it is to be understood that the invention is not necessarily limited to the specific features or methods described. Rather, the specific features and methods are disclosed as exemplary implementations for the position keeping systems and methods.

We claim:

1. A computer implemented method of implementing position-keeping in a multi-market environment, the computer implemented method comprising:
   identifying, by a processor, a plurality of instrument transaction parameters based on a universal instrument ID of at least one instrument, wherein the instrument transaction parameters comprise a market level identifier, a register level identifier, and a batch size identifier, the market level identifier being indicative of an official place of listing of the instrument, the register level identifier being indicative of a currency of transacting the instrument, and the batch size identifier being indicative of a tradable batch size of the at least one instrument;
   generating, by the processor, at least one consolidation line for the instrument based on at least the plurality of instrument transaction parameters, wherein the position-keeping is achieved based on the consolidation line; and
   achieving, by the processor, a transaction of the instrument based on the consolidation line and the universal instrument ID of the at least one instrument, wherein the transaction comprises at least one of a trading transaction, settlement, holdings for valuation, tax processing, a corporate action, and a query to determine trading position of a user associated with the transaction, and wherein the achieving comprises configuring, by the processor, a position-keeping key for the instrument based at least on the universal instrument ID of the instrument and the consolidation line, for achieving position-keeping, the position-keeping key being indicative of fungibility of the instrument with listings of the instrument in the multi-market environment.

2. The computer implemented method as claimed in claim 1, wherein achieving the transaction further comprises associating, by the processor, at least one position of the instrument to the at least one consolidation line for achieving position-keeping.

3. The computer implemented method as claimed in claim 1 wherein the transaction is achieved by the processor based on the position-keeping key.

4. The computer implemented method as claimed in claim 1 wherein the achieving the transaction comprises determining, by the processor, a trading position of a user with respect to a position of the instrument on the consolidation line, based on the position-keeping key.

5. A position-keeping system comprising:
   a processor; and
   a memory coupled to the processor, the memory comprising:

an identification module configured to identify a plurality of instrument transaction parameters based on a universal instrument ID of at least one instrument; and a position-keeping engine configured to create a position-keeping key, based on the plurality of instrument transaction parameters and the universal instrument ID, to indicate a trading position of a user with respect to the instrument, wherein the position-keeping key is indicative of fungibility of the instrument with listings of the instrument in a multi-market environment, and wherein the instrument transaction parameters comprise at least a market level identifier and a register level identifier, wherein the market level identifier is indicative of an official place of listing of the instrument and the register level identifier is indicative of a currency of transacting the instrument, and wherein the trading position is indicated with reference to at least one of a trading transaction, settlement, holdings for valuation, tax processing, and a corporate action.

6. The position-keeping system as claimed in claim 5, wherein the position-keeping engine is further configured to generate a consolidation line based on the plurality of instrument transaction parameters for creating the position-keeping key.

7. The position-keeping system as claimed in claim 5, wherein the position-keeping engine is further configured to update the trading position of the user with respect to the instrument based on at least one primary transaction parameter, at least one secondary transaction parameter, at least one tertiary transaction parameter, and the position-keeping key for the instrument.

8. The position-keeping system as claimed in claim 5, further comprising a transaction module configured to:
- obtain at least one first-pass primary transaction parameter for the at least one instrument;
- ascertain at least one second-pass primary transaction parameter based on an analysis of the at least one first transaction parameter;
- execute a transaction of the instrument based on at least the first-pass primary transaction parameter, a second-pass primary transaction parameter selected from the at least one second-pass primary transaction parameter, and the position-keeping key for the instrument.

9. The position-keeping system as claimed in claim 8, wherein the transaction module is configured to receive at least one secondary transaction parameter and at least one tertiary transaction parameter to execute the transaction of the instrument.

10. The position-keeping system as claimed in claim 8, wherein the transaction module is further configured to validate the transaction of the instrument based at least on the first-pass primary transaction parameter, the second-pass primary transaction parameter, and the position-keeping key.

11. The position-keeping system as claimed in claim 5, wherein the instrument transaction parameters further comprise a batch size identifier indicative of a tradable batch size of the at least one instrument.

12. A non-transitory computer readable medium having embodied thereon a computer program for executing a method of position-keeping in a multi-market environment, the method comprising:
- receiving at least one first-pass primary transaction parameter for at least one instrument in a user transaction account;
- identifying at least one second-pass primary transaction parameter based on the at least one first-pass primary transaction parameter; and
- achieving a transaction of the instrument based on the first-pass primary transaction parameter, a selected second-pass primary transaction parameter and a position-keeping key for the at least one instrument, wherein the position keeping key comprises a universal instrument ID, a market level identifier, and a register level identifier, the market level identifier being indicative of an official place of listing of the instrument and the register level identifier being indicative of a currency of transacting the instrument, and wherein the position-keeping key is indicative of fungibility of the instrument with listings of the instrument in the multi-market environment, and wherein the transaction comprises at least one of a trading transaction, settlement, holdings for valuation, tax processing, a corporate action, and a query to determine trading position of a user associated with the transaction.

13. The non-transitory computer readable medium as claimed in claim 12, wherein the at least one first-pass primary transaction parameter comprises a user transaction account and a universal instrument ID.

14. The non-transitory computer readable medium as claimed in claim 13, wherein the at least one first-pass primary transaction parameter further comprises at least one of a trading market identifier and a consolidation line, wherein the consolidation line comprises at least one of the market level identifier, the register level identifier, and a batch size identifier.

15. The non-transitory computer readable medium as claimed in claim 14, wherein the trading market identifier is an identifier for a stock exchange.

16. The non-transitory computer readable medium as claimed in claim 12, wherein the at least one second-pass primary transaction parameter comprises at least one of a trading market identifier and a consolidation line, wherein the consolidation line comprises at least one of the market level identifier, the register level identifier, and a batch size identifier.

17. The non-transitory computer readable medium as claimed in claim 12, wherein the achieving further comprises obtaining at least one secondary transaction parameter to achieve the transaction of the instrument, wherein the at least one secondary transaction parameter comprises a custodian ID, and a place of safekeeping of the instrument.

18. The non-transitory computer readable medium as claimed in claim 12, wherein the achieving further comprises obtaining at least one tertiary transaction parameter to complete the transaction, wherein the at least one tertiary transaction parameter comprises a custodian ID of a counterparty and a place of settlement for the instrument.

\* \* \* \* \*